United States Patent [19]
Fuchs et al.

[11] Patent Number: 4,783,649
[45] Date of Patent: Nov. 8, 1988

[54] VLSI GRAPHICS DISPLAY IMAGE BUFFER USING LOGIC ENHANCED PIXEL MEMORY CELLS

[75] Inventors: Henry Fuchs, Pittsboro; John W. Poulton, Durham, both of N.C.

[73] Assignee: University of North Carolina, Chapel Hill, N.C.

[21] Appl. No.: 408,045

[22] Filed: Aug. 13, 1982

[51] Int. Cl.⁴ .............................................. G09G 1/16
[52] U.S. Cl. .................................... 340/747; 340/750; 340/725; 340/799
[58] Field of Search ............... 340/700, 720, 747, 723, 340/725, 798, 799, 729

[56] References Cited

U.S. PATENT DOCUMENTS

| | | |
|---|---|---|
| 3,441,789 | 4/1969 | Harrison, III . |
| 3,454,822 | 7/1969 | Harrison, III . |
| 3,473,160 | 10/1969 | Wahlstrom . |
| 3,523,289 | 8/1970 | Harrison, III . |
| 3,585,628 | 6/1971 | Harrison, III . |
| 3,602,702 | 8/1971 | Warnock . |
| 3,603,964 | 9/1971 | Harrison, III . |
| 3,639,736 | 2/1972 | Sutherland . |
| 3,665,408 | 5/1972 | Erdahl et al. . |
| 3,684,876 | 8/1972 | Sutherland . |
| 3,700,792 | 10/1972 | Harrison, III . |
| 3,723,803 | 3/1973 | Harrison, III . |
| 3,772,658 | 11/1973 | Sarlo . |
| 3,775,005 | 11/1973 | Szabo . |
| 3,778,810 | 12/1973 | Hayashi . |
| 3,815,095 | 6/1974 | Wester . |
| 3,816,726 | 6/1974 | Sutherland et al. . |
| 3,889,107 | 6/1975 | Sutherland . |
| 3,942,163 | 3/1976 | Goyal . |
| 3,988,728 | 10/1976 | Inoue et al. . |
| 4,060,713 | 11/1977 | Golay . |
| 4,127,849 | 11/1978 | Okor . |
| 4,184,206 | 1/1980 | Harano . |
| 4,208,719 | 6/1980 | Lotz et al. . |
| 4,208,810 | 6/1980 | Rohner et al. . |
| 4,222,076 | 6/1980 | Knowlton . |
| 4,224,600 | 9/1980 | Sellner . |
| 4,225,929 | 9/1980 | Ikeda . |
| 4,231,095 | 10/1980 | Cassagne . |
| 4,261,018 | 4/1981 | Knowlton . |
| 4,590,465 | 5/1986 | Fuchs ................................ 340/750 |

OTHER PUBLICATIONS

Weinberg, R.; "Parallel Processing Image Synthesis and Anti-Aliasing", Computer Graphics, vol. 15, No. 3, pp. 55-62 (1981).
Whitted, T.; "Hardware Enhanced 3-D Raster Display System", pp. 349-356, CMCCS/ACCHO (1981).
Clark, J.; "Structuring a VLSI System Architecture", Lambda, pp. 25-30, Second Quarter (1980).
Henry Fuchs, John Poulton, Alan Paeth, Alan Bell, (List continued on next page.)

*Primary Examiner*—Marshall M. Curtis
*Attorney, Agent, or Firm*—Cushman, Darby & Cushman

[57] ABSTRACT

A VLSI graphics display image buffer which enables the graphics display system of Fuchs U.S. Pat. No. 4,590,465 to be economically realized. According to the present invention, the X and Y multiplier trees disclosed in Fuchs U.S. Pat. No. 4,590,465 can be combined into a single tree and connected to an IC memory grid of conventional design. Special memory chips of this design are then much like conventional RAM chips with only a small amount of additional logic circuitry. However, the standard grid of memory cells on such a chip is organized so that each row of memory cells corresponds to the different bits of the single pixel, whereas each column is the corresponding bit in every pixel. Each output of the X-Y multiplier tree is then available to the circuitry associated with a particular pixel and its row of memory cells. These VLSI chips can be organized so that the system can be implemented by a set of identical chips that need no special interconnection. All control and data input signals may be broadcasted to the chips by simulating on each chip the top parts of the X-Y multiplier tree. In other words, the simulated tree levels are loaded with the high order bits of the X and Y addresses of the screen area represented by the pixels of the particular chip.

7 Claims, 5 Drawing Sheets

OTHER PUBLICATIONS

"Developing Pixel-Planes, A Smart Memory-Based Raster Graphics System", Conference on Microelectronics and VLSI at MIT on Jan. 25, 1982.

Sutherland et al., "A Characterization of Ten-Hidden Surface Algorithms", Computer Surveys 6(1): Mar. 1, 1974.

Parke, F. I.; "Simulation and Expected Performance Analysis of Multiple Processor Z-Buffer Systems", Association for Computer Machinery, Publication No. 0-89791-021-4/80/0700-0048, pp. 46-56 (1980).

"Two's Complement Pipeline Multipliers", by R. F. Lyon, IEEE Transactions on Communications, vol. CO-M-24, Apr. 1976, pp. 418-425.

Chapter 22, Newman and R. F. Sproull, "Principals of Interactive Computer Graphics", 2nd ed., McGraw Hill 1979.

Chapter 8 of J. D. Foley and H. Vandam, "Fundamentals of Interactive Computer Graphics", Addison-Westley, 1982.

VLSI GRAPHICS DISPLAY IMAGE BUFFER USING LOGIC ENHANCED PIXEL MEMORY CELLS

The present invention relates to a graphics display system, and in particular to a raster type graphics display system suitable for very large scale integration (VLSI).

The present invention is an improvement of U.S. patent application Ser. No. 349,818, now U.S. Pat. No. 4,590,465, filed Feb. 18, 1982, by Henry Fuchs, entitled "Graphics Display System Using Logic-Enhanced Pixel Memory Cells" (hereinafter the Fuchs application). The Fuchs application is incorporated herein by reference.

Briefly, the Fuchs application describes a relatively inexpensive raster-scan type graphics system capable of real-time operation by utilizing logic-enhanced pixels within the image buffer and permitting parallel (simultaneous) calculations at every pixel. A typical implementation would be as custom VLSI chips which effect various processing sequences. In the sequence of most general application, each polygon is operated upon in sequence, and the image is built up as the polygons are processed without the necessity of sorting. With respect to each successive polygon, the following operations are effected: (1) all pixels within the polygon are identified; (2) the respective pixels which would be visible to the observer, that is, not obstructed by some previously processed polygon, are determined; and (3) the proper color intensities for each visible pixel are determined.

Each of the aforementioned operations is performed simultaneously (i.e. in parallel) for each pixel in the polygon, utilizing what may be termed an enhanced memory cell associated with each pixel. Further processing circuit efficiencies are achieved by using a single circuit for all of the above-noted operations. This is made possible by use of a representation method amenable to all three operations, namely the value of a variation of the expression $F(x, y) = Ax + By + C$ is calculated for each pixel memory element, where x, y are the coordinates of the pixel in the image. Further, processing and space efficiencies are realized by the capability of the system to calculate the expression without necessitating the x, y address to be explicitly specified in any location. A special purpose computer calculates the respective coefficients for the various equations, and signals indicative of the coefficients are applied to what may be termed serial multiplier trees. The multiplier trees generate value for Ax, By and C for every value of x and every value of y in the pixel matrix. The respective Ax, By and C values then are combined in the individual enhanced memory cells corresponding to the x and y values.

In the Fuchs application, the respective memory cells are physically organized in a matrix format. However, in some instances, physical organization of the memory cells in a matrix format may be disadvantageous in respect of very large scale integration of the system, and with respect to the ability to expand the capability of the system.

SUMMARY OF THE INVENTION

The present invention provides an alternative organization for an enhanced memory buffer compatible with VLSI. A VLSI graphics display image buffer which enables the graphics display system of Fuchs U.S. Pat. No. 4,590,465 to be economically realized. According to the present invention, the X and Y multiplier trees disclosed in Fuchs U.S. Pat. No. 4,590,465 can be combined into a single tree and connected to an IC memory grid of conventional design. Special memory chips of this design are then much like conventional RAM chips with only a small amount of additional logic circuitry. However, the standard grid of memory cells on such a chip is organized so that each row of memory cells corresponds to the different bits of the single pixel, whereas each column is the corresponding bit in every pixel. Each output of the X-Y multiplier tree is then available to the circuitry associated with a particular pixel and its row of memory cells. These VLSI chips can be organized so that the system can be implemented by a set of identical chips that need no special interconnection. All control and data input signals may be broadcasted to the chips by simulating on each chip the top parts of the X-Y multiplier tree. In other words, the simulated tree levels are loaded with the high order bits of the X and Y addresses of the screen area represented by the pixels of the particular chip.

BRIEF DESCRIPTION OF THE DRAWINGS

A preferred exemplary embodiment will hereinafter be described in conjunction with the appended drawings wherein like numerals denote like elements and.

DETAILED DESCRIPTION OF A PREFERRED EXEMPLARY EMBODIMENT

FIGS. 1-4 show the Fuchs Graphic System 10 of U.S. Pat. No. 4,590,465, the enhanced memory frame buffer 18, an exemplary serial multiplier tree 202, and individual enhanced memory cell 200 of the Fuchs system, respectively. The portion of the Fuchs U.S. Pat. No. 4,590,465 describing such system and elements is here incorporated by reference.

Figure 1:
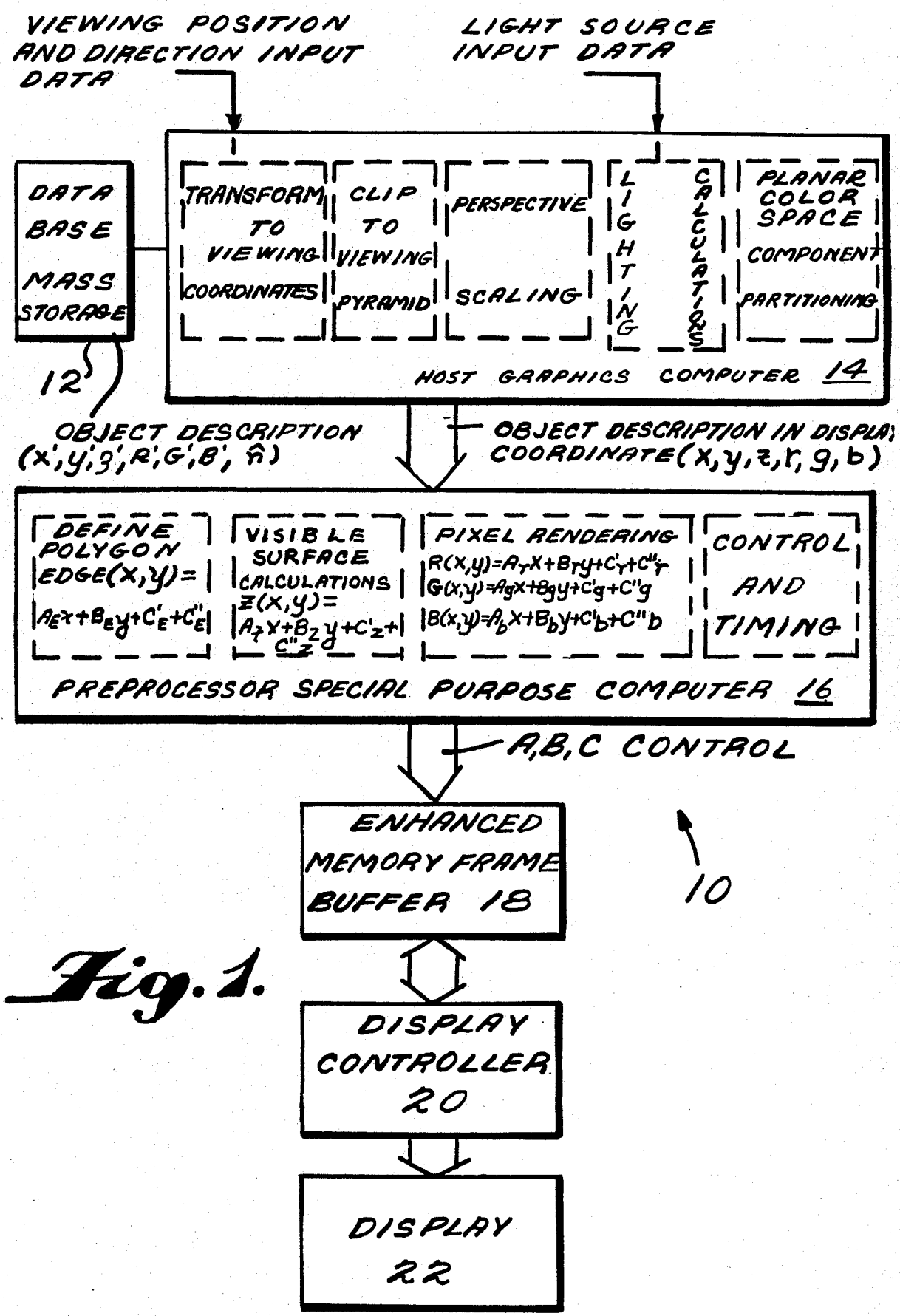
FIG. 1 is a schematic block diagram of the Fuchs graphic display system of U.S. Pat. No. 4,590,465.
Figure 2:
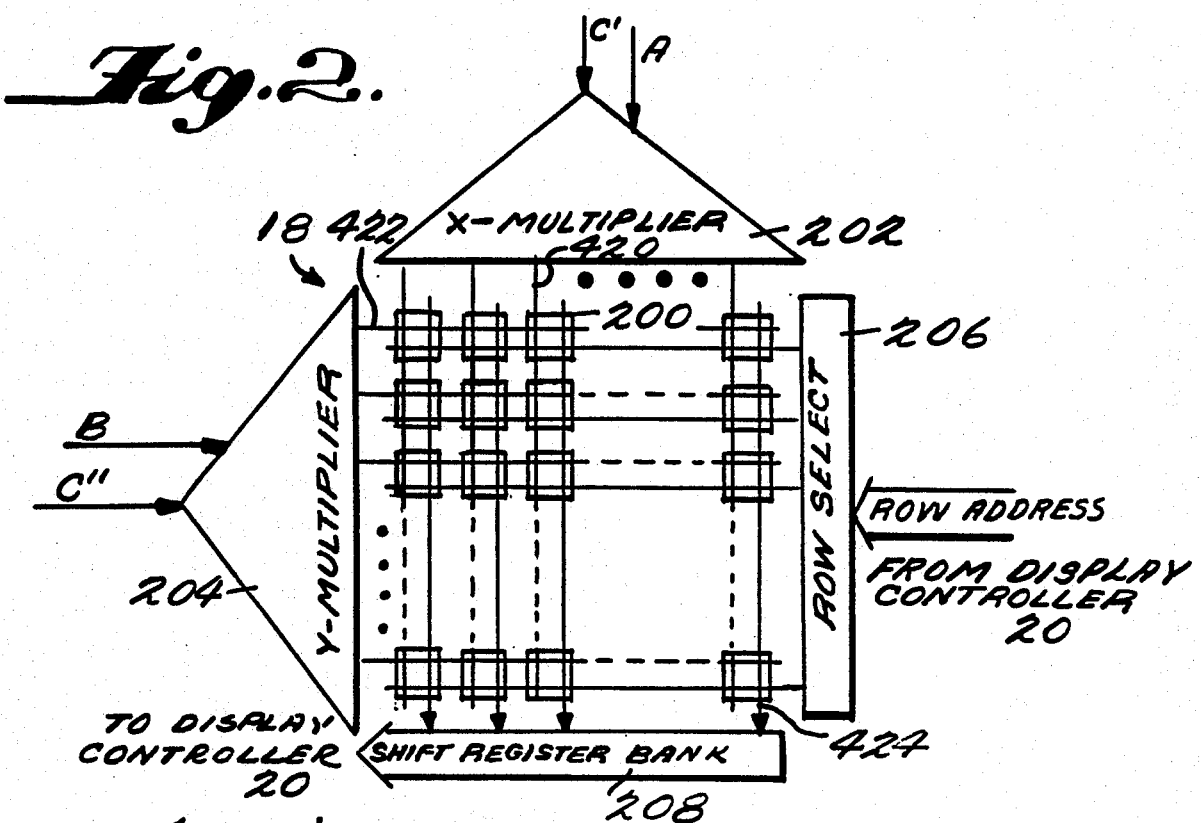
FIG. 2 is a block diagram of the enhanced memory of the Fuchs system of U.S. Pat. No. 4,590,465.
Figure 3:
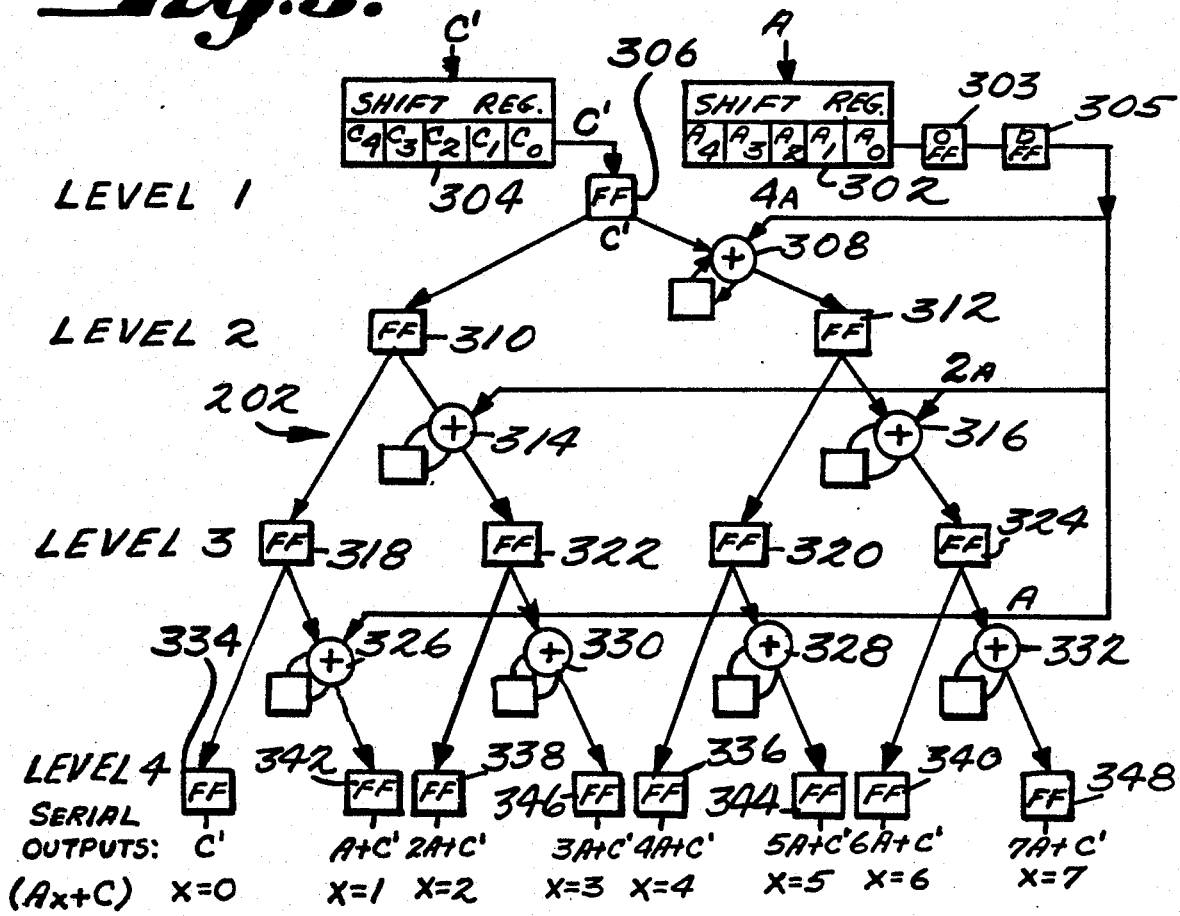
FIG. 3 is a schematic block diagram of a serial multiplier tree of the Fuchs system of U.S. Pat. No. 4,590,465.
Figure 5:
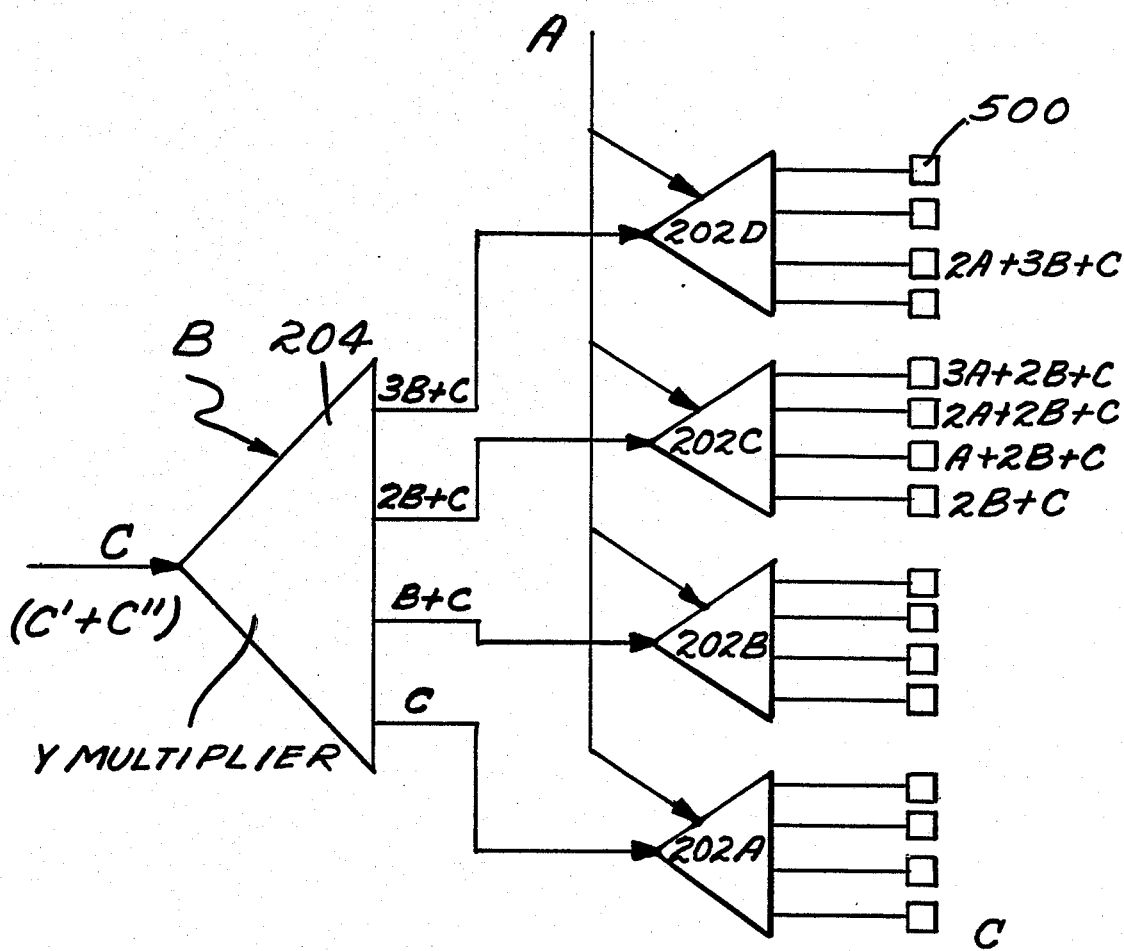
FIG. 5 is a block diagram of an enhanced memory buffer suitable for VSLI in accordance with the present invention.

Referring now to FIG. 5, an alternative organization of an enhanced memory buffer in accordance with the present invention is shown. In this case, a lead multiplier (here y multiplier 204) and a plurality of subsequent multipliers (here x multipliers 202) are used, one for each output of the lead multiplier. More particularly, the C and C' coefficients used in the embodiments of the Fuchs system shown in FIG. 2 are combined into a single C component ($C = C' + C''$). The C coefficient then is applied to the first level flip flop (flip flop 306 of FIG. 3) of the lead multiplier (e.g. y multiplier 204). The B coefficients are also applied as input signals to each of the respective adders in multiplier tree 204. The result is that respective serial output signals are generated which are indicative of $By + C$ for each value of y in the display matrix, in the manner previously explained. For the sake of simplicity, FIG. 5 illustrates the equivalents of a 4×4 matrix only, and the y output signals accordingly are serial representations of C, B+C, 2B+C, and 3B+C.

Each of the y multiplier 204 output signals then is applied to the first level flip flop input (flip flop 306 in FIG. 3) of a respective x multiplier 202 (202a, 202b, 202c, 202d). The A coefficient is applied to the respective adders of each of the x multipliers 202. Each of the x multipliers 202 generates a respective output signal equal to Ax plus the input signal from the y multiplier for each value of x in the display. Each output signal from the x multipliers 202 are applied to a corresponding memory cell 500. The set of memory cells 500 coupled to each individual x multiplier 202 correspond to a row in the display matrix.

Figure 4:
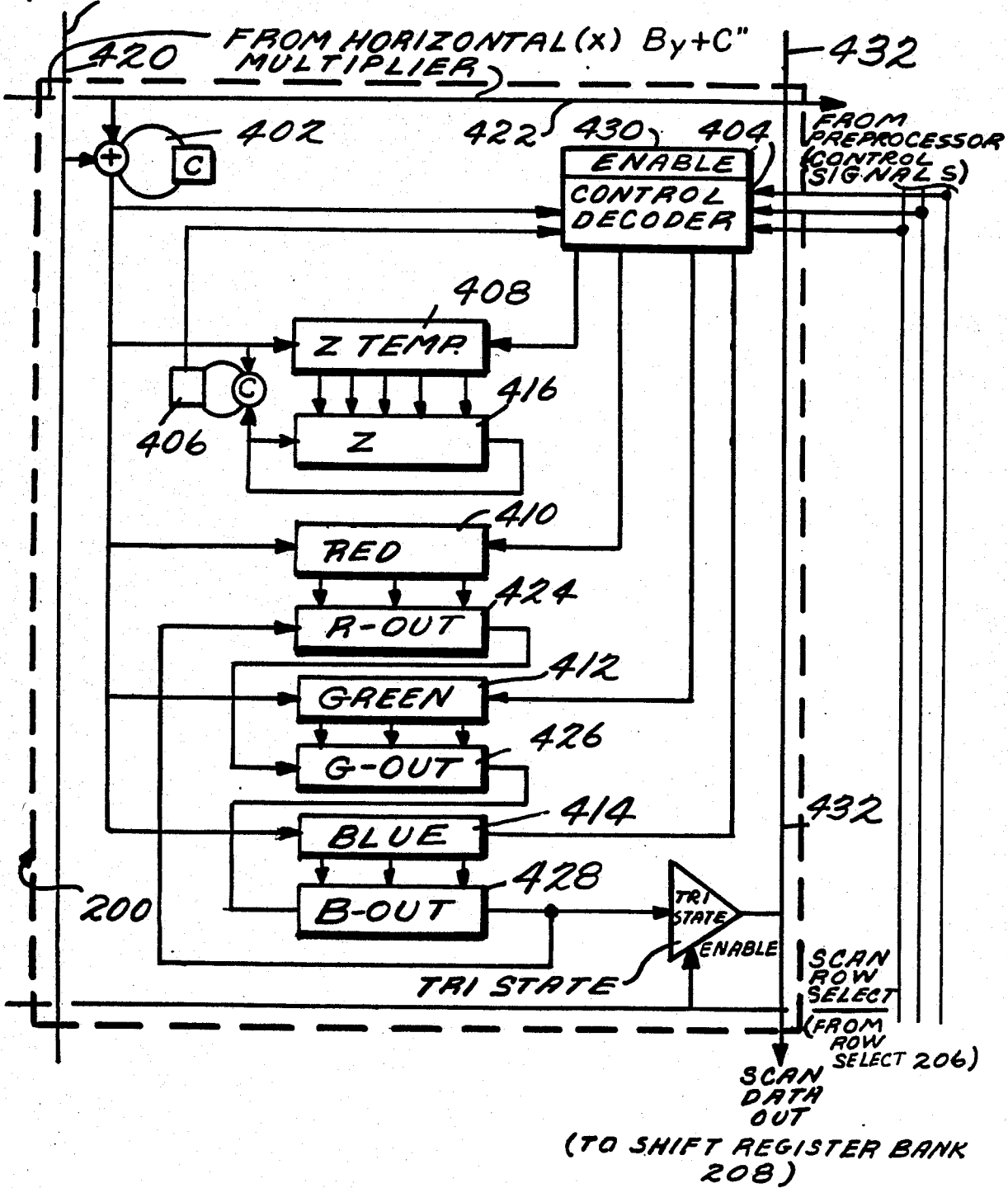
FIG. 4 is a schematic block diagram of an individual enhanced memory cell of the Fuchs system of U.S. Pat. No. 4,590,465.

For example, x multiplier 202c receives a serial signal indicative of 2B+C from y multiplier 204. Accordingly, multiplier 202c generates respective serial output signals indicative of 2B+C, A+2B+C, 2A+2B+C, and 3A+2B+C (the values for the elements of the row y=2). It should be noted that the addition step performed by adder 402 in memory cell 200 is inherently performed by multiplier trees 204 and 202, when connected as shown in FIG. 5. Accordingly, respective memory cells 500 are essentially identical to memory cell 200 as shown in FIG. 4 with the exception that adder 402 is deleted.

Figure 6:
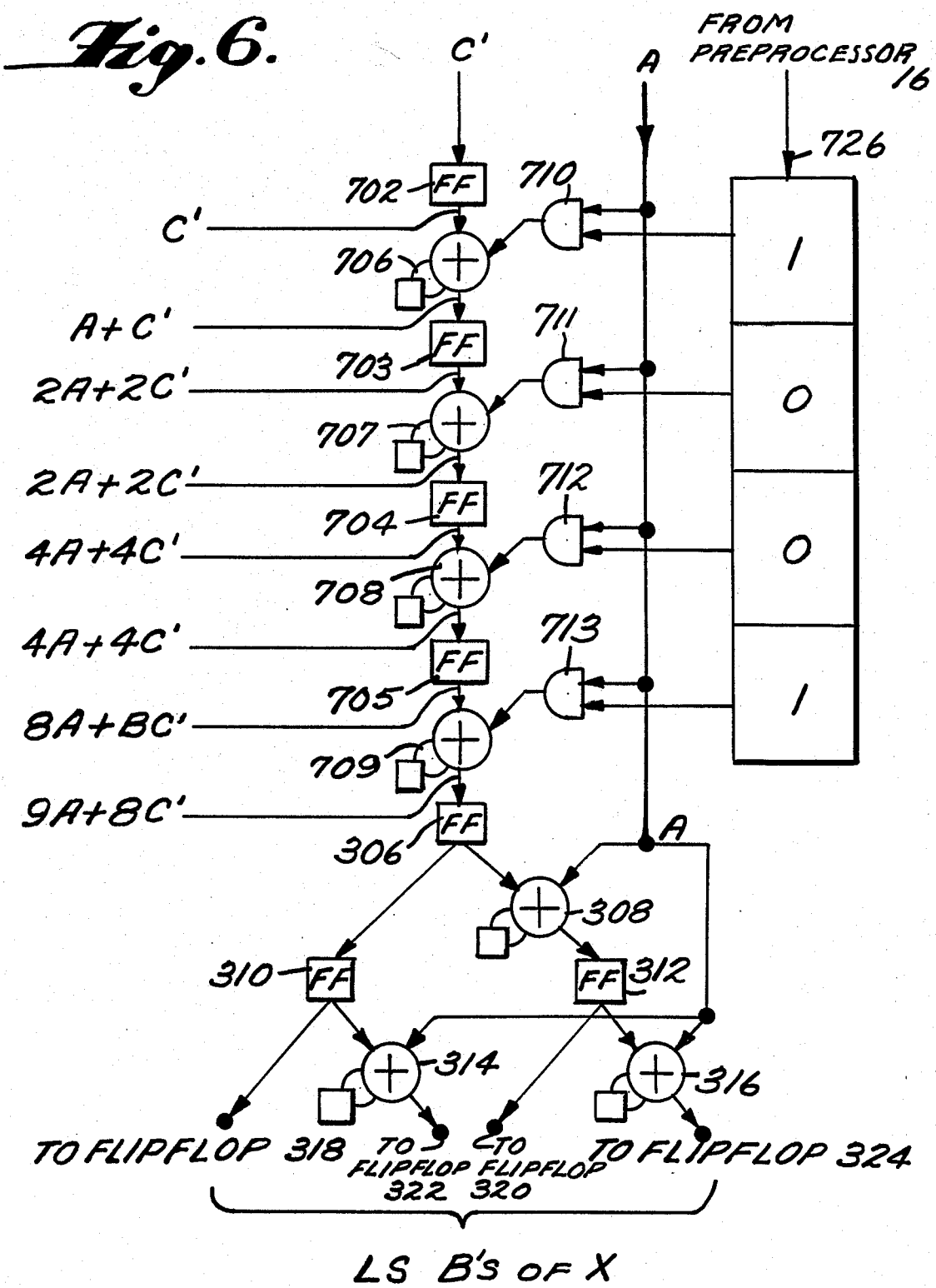
FIG. 6 is a block diagram of a VSLI chip for implementing an enhanced memory buffer with identical component chips.

It is desirable, for purposes of large scale integration and system flexibility, that enhanced memory frame buffer 18 be implemented with an array of identical individual chips. Each chip would suitably include a copy of both the x and y multiplier trees. For example, in a system designed to control a 512 by 512 display matrix, each chip suitably would include a matrix of 16 rows by 32 columns of individual cells, and x and y multiplier trees of commensurate extent (i.e. a four level x multiplier and a five level y multiplier). In addition, in order to provide for cooperation of the various multiplier trees on the individual chips as a single multiplier tree, provisions must be made to simulate preceding multiplier levels. Such provisions are schematically shown in FIG. 6. For purposes of illustration, it is assumed that the multiplier tree on the chip includes 5 flip flop/adder levels (i.e. provides 32 outputs), although only two such flip flop/adder levels are shown.

Referring to FIG. 6, a plurality of flip flops 702, 703, 704, and 705 and adders 706, 707, 708 and 709 are disposed in an alternating series and coupled to the input of the first level flip flop 306 of the multiplier. The number of flip flop/adder pairs in the sequence is chosen to be equal to the difference (e.g. 4) between the number of flip flop/adder levels in a multiplier tree sufficient for the entire matrix (e.g. a 9 level tree for a 512 column matrix) and the number (e.g. 5) of levels sufficient for the pixel columns in the particular chip (e.g. 32). The C' coefficient is applied to flip flop 702, and the output of each flip flop is applied as an input to the succeeding adder. The output of adder 709 is applied to first level flip flop 306. The other input of adders 706-709 are receptive of the output signals of the respective two input AND gates, 710, 711, 712 and 713. One input of each of AND gates 710-713 is receptive of the serial representation of the A coefficient. The other input of each of the AND gates 710-713 is coupled to a corresponding storage element (bit) in a register 726.

Register 726 latches signals indicative of the most significant bits of a binary representation of the x coordinates of the pixels on the particular chip. Flip flops 702-705 and adders 706-709 cooperate with AND gates 710-713 and register 726 to, in effect, simulate the preceeding level of the composite multiplier tree. The register 726 of the chip designated to contain the pixels corresponding to the first 32 x values (x=0 ... 31) would be loaded with all 0's. The contents of register 726 in that chip would therefore inhibit each of AND gates 710-713. Accordingly, flip flop 306, (after a delay of four bit periods) would receive an altered serial representation of the C' coefficient. Conversely, register 726 in the chip designated to contain pixels corresponding to x=288-319 would be loaded with a digital representation of 288 as shown in FIG. 6.

Accordingly, for the example shown in FIG. 6, AND gates 710 and 713 are enabled, while AND gates 711 and 712 are inhibited by the contents of register 726. Accordingly, the output signals of flip flop 702, adder 706, flip flop 703, adder 707, flip flop 704, adder 708, flip flop 705 and adder 709 are serial representations of C', C'+A, 2(C'+A), 2(C'+A), 4(C'+A), 8(C'+A) and 8C'+9A, respectively. The serial input signal to flip flop 306 is thus identical to that which would have been received by a flip flop in the appropriate position in the fifth tier of a nine tier (level) multiplier tree. Accordingly, the 32 outputs provided by the multiplier tree correspond to x=288, 289 ... 319. A similar addressing system would be utilized with the y multipliers of each respective chip. Thus, enhanced memory frame buffer 18 can be implemented with an array of identical chips cooperating with a shift register and appropriate row selection logic for outputting the information to the display controller.

For additional description, reference is made to Fuchs and Poulton, "Pixel-Planes: A VLSI oriented Design for a Raster Graphics Engine", VLSI Design, Vol. 3, Third Quarter 1981, such article also being herein incorporated by reference.

It will be understood that the Figures of the appending drawing are block schematic in nature, and that various control signal paths and the like are not shown. Further, while various of the conductors/connections are shown in the drawings as single lines there are not so shown in a limiting sense and may comprise plural conductors/connections as is understood in the art. Moreover, the above description is of preferred exemplary embodiments of the present invention and the invention is not limited to the specific for shown. Modifications may be made in the design and arrangement of the elements without departing from the spirit of the invention as expressed in the appended claims.

What is claimed is:

1. An image buffer for a graphics display apparatus which displays an image formed from an inputted image description representing a plurality of component surfaces of said image as intensity values of respective pixels, comprising:
 a serial multiplier tree circuit for evaluating an expression of the form AX+BY+C, where A, B and C are first, second and third coefficient values, respectively, X is a coordinate of a corresponding pixel in a matrix of the pixels of said graphics display apparatus, and Y is another coordinate, perpendicular to X, of the corresponding pixel in the matrix of the pixels of said graphics display apparatus, said expression including representations of respective aspects of each component surface of the inputted image description including representations of at least one of the projection of an inputted component surface, the depth of said inputted component surface with respect to other component surfaces of said image, and the color of said inputted component surface, said tree circuit including: (a) at least one leading multiplier comprising a plurality of respective adders which receive at first and second inputs thereof coefficients B and C, respectively, said leading multiplier producing respective first serial output signals at a plurality of outputs thereof representing an expression $BY+C$, and (b) a plurality of subsequent multipliers respectively connected to respective outputs of said leading multiplier, each subsequent multiplier including a plurality of respective adders which receive a respective first serial output signal from said leading multiplier at a first input and coefficient A at a second input thereof for producing respective second serial output signals as said expression $AX+BY+C$ at a plurality of outputs thereof; and a plurality of memory cells responsive to said respective second serial output signals for determining in parallel, at each cell, the value of said expression $AX+BY+C$ at the positions of the memory cells corresponding to each said pixel, and for selectively storing intensity values of said respective aspects of each component surface of the inputted image description in each cell corresponding to a pixel within the component surface of said inputted image description.

2. An image buffer as in claim 1, wherein said tree circuit and said plurality of memory cells are formed on a plurality of identical semiconductor chips, each chip including a predetermined number of storage devices and one-bit adders, alternately connected in series, and means for selectively applying coefficients A and B to one input of each of said one-bit adders and for applying coefficient C to another input of the first one-bit adder of said series.

3. An image buffer as in claim 2, wherein said leading multiplier and said subsequent multipliers each comprise a series of levels of simultaneously clocked storage devices and one-bit adders with carry, an output of each storage device in each level being applied as a first input to a storage device and an adder nominally in the next successive level, an adder in the next successive level of said leading multiplier also receiving as a second input coefficient B and further providing an output which is applied to a storage device nominally in the next successive level of said leading multiplier, whereas an adder in the next successive level of each of said subsequent multipliers receives as a second input coefficient A and further provides an output which is applied to a storage device nominally in the next successive level.

4. An image buffer as in claim 3, further comprising means for simulating preceding levels of said leading and subsequent multipliers, said simulating means comprising a plurality of storage device and adder pairs disposed in an alternating series, the number of said storage device and adder pairs being equal to the difference between the number of levels in a multiplier tree sufficient to designate all of the columns of pixels of said graphics display apparatus and the number of levels formed by the storage devices and one-bit address sufficient for the number of pixel columns formed on each of said identical semiconductor chips.

5. An image buffer as in claim 4, wherein said simulating means further comprises a register which latches signals indicative of the most significant bits of a binary representation of a coordinate value of a pixel of said graphics display apparatus, and gating means reponsive to the contents of said register for selectively gating coefficient A to respective inputs of respective adders of said storage device and adder pairs, an output of the final adder in said series of storage device and adder pairs being inputted into a subsequent multiplier whose preceding levels are being simulated.

6. An image buffer as in claim 5, wherein each of said storage devices is a flip-flop and said gating means is comprised of a plurality of AND gates which receive respective bits of the contents of said register at a first input and coefficient A at a second input thereof.

7. An image buffer as in claim 1, wherein the respective second serial output signals outputted by said subsequent multipliers correspond to a row of memory cells which similarly correspond to a row of pixels of said graphics display apparatus, said memory cells selectively storing said intensity values for each pixel of said row of pixels of said graphics display apparatus.

* * * * *